United States Patent
Hill et al.

[19]

[11] Patent Number: 6,097,930
[45] Date of Patent: Aug. 1, 2000

[54] SYSTEM AND METHOD FOR MODELING SIMULCAST DELAY SPREAD AND OPTIMIZING LAUNCH DELAYS

[75] Inventors: Selwyn E. Hill, Dallas; Chi-Ming Chang, Plano, both of Tex.

[73] Assignee: Weblink Wireless, Inc., Dallas, Tex.

[21] Appl. No.: 09/138,438

[22] Filed: Aug. 21, 1998

[51] Int. Cl.$^7$ .................................................. H04Q 7/00
[52] U.S. Cl. ........................................ 455/31.1; 455/67.6
[58] Field of Search ................................ 455/31.1, 67.6; 370/342

[56] References Cited

U.S. PATENT DOCUMENTS 5,568,472  10/1996  Umeda et al. ............................ 370/342
5,828,659  10/1998  Teder et al. .............................. 455/67.6

*Primary Examiner*—Salvatore Cangialosi
*Attorney, Agent, or Firm*—Novakov Davis, P.C.

[57] ABSTRACT

There is disclosed a launch delay controller, for use in a wireless messaging system having a defined coverage area. The launch delay controller controls the transmission of paging messages from a plurality of transmitters in the wireless messaging system. The launch delay controller comprises: 1) a memory capable of storing a) a delay spread associated with a selected point in the coverage area between a first signal transmitted by a first of the plurality of transmitters and a second signal transmitted by a second of the plurality of transmitters, and b) distances between the selected point and the first and second transmitters; and 2) a processor capable of determining from the delay spread and the distances an offset delay, wherein the offset delay is used by the first transmitter to delay a transmission of the first signal with respect to a transmission of the second signal, the delayed transmission of the first signal thereby reducing the delay spread.

20 Claims, 4 Drawing Sheets

SYSTEM AND METHOD FOR MODELING SIMULCAST DELAY SPREAD AND OPTIMIZING LAUNCH DELAYS

TECHNICAL FIELD OF THE INVENTION

The present invention is directed, in general, to wireless communication systems and methods of operating the same, and, in particular, to a system for modeling simulcast delay spread and determining optimum transmitter launch delay values in a wireless messaging system.

BACKGROUND OF THE INVENTION

The demand for better and cheaper wireless telecommunication services and equipment continues to grow at a rapid pace. Part of this demand includes wireless message paging devices, which have become ubiquitous in society. Traditional one-way message paging devices (or "beepers") are giving way to newer two-way message paging devices. Additionally, the types of messages that may be send to a beeper have expanded from short telephone number messages to longer length alphanumeric messages and even to voice messages. In some systems, wireless messages may comprise an alphanumeric or voice message to which an electronic file, such as a text document, may be attached.

Much of this growth resulted from the Federal Communication Commission's ("FCC") approval of certain frequency bands for the next generation of Personal Communication Service ("PCS") devices that provide voice telephone service as well as advanced voice and/or data message paging services. A relatively small portion of the available spectrum was set aside for narrowband PCS, which is more suited to advanced message paging services, to encourage efficient use of the available spectrum.

Despite the wider use of higher precision electronics, the implementation of time division multiple access (TDMA), frequency division multiple access (FDMA), and code division multiple access (CDMA) technologies, and the advent of narrowband PCS services, traditional problems associated with wireless messaging still persist. Paging messages are frequently not delivered to a subscriber. Part of the reason for this is that RF signal obstructions, RF noise, and multipath delay fading remain significant hindrances to wireless messaging systems.

The structure of traditional message paging systems have been somewhat different than cellular telephone systems. In a message paging system, all of the base station transmitters throughout a wide coverage area are synchronized and simultaneously broadcast (i.e., simulcast) a burst of many paging messages in a forward-channel to the paging devices of the system subscribers. This simulcast increases the likelihood that the paging message will reach the pager even through obstacles, such as buildings. Generally, paging systems do not assign each subscriber to a cell and transmit to the subscriber only in that cell, as in the case of a cellular telephone system.

A paging device that is situated relatively close to a base station transmitter generally receives a strong signal from the nearby transmitter that overpowers time-delayed, but much weaker, signals from more remote transmitters. However, as a subscriber moves from the coverage area of the nearby base station transmitter toward the coverage area of a more remote transmitter, the paging device necessarily moves through an intermediate region in which the signals from both base station transmitters are of comparable magnitude. In this region it is important to minimize the amount of delay spread between the two signals.

The traditional method of dealing with delay spread is to synchronize as accurately as possible the launches of paging messages from all transmitters. This may be accomplished in a variety of ways. For instance, in a paging system using a satellite downlink, a paging message queue can be transmitted by the satellite to a group of base station transmitters covering a certain coverage area. A memory in each base station transmitter stores time proportional to the exact distance between the base station transmitter and the satellite. Each base station transmitter can then use this (time difference) to calculate the "time-of-flight" delay from the satellite to the base station transmitter. Accordingly, base station transmitters that are closer to the satellite can delay the launch of the paging message queue to compensate for the longer time-of-flight delays of more remote base station transmitters. In this manner, the burst of paging messages are launched nearly simultaneously from the base station transmitters, and delay spread is minimized in regions approximately midway between base station transmitters.

In wired paging message systems, a wired backbone is used to deliver paging message queues from a central paging server to the base station transmitters. In these systems, a timing signal may be used to trigger the launch of the paging messages. Similarly to satellite-based systems, a memory in each base station transmitter stores the delay times, which correspond to distances, between the base station transmitter and the central paging server. Each base station transmitter can then use the wire length to calculate the signal delays from the central paging server to the base station transmitter. Accordingly, base station transmitters having short signal delays can delay the launch of the paging message queue to compensate for longer signal delays experienced by more remote base station transmitters. Alternatively, the base station transmitters may use an external clock signal to trigger the launch of the paging message queues, such as a clock signal from the global positioning satellite (GPS) system.

The above-described methods of synchronizing the launch of paging messages from a plurality of base station transmitters in a paging coverage area in order to minimize the effects of delay spread are still not sufficient to eliminate all problems related to delay spread. Frequently, terrain features and man-made objects may obstruct some signals and reflect others. These factors may have the combined effect of attenuating the comparatively strong signals from nearby base station transmitters relative to the comparatively weak (and time-delayed) signals received from more remote base station transmitters. This is particularly true if remote transmitters are located on high ground, such as on surrounding mountain tops. Thus, at any given point in a paging system, a paging device may still receive time-delayed versions of the same signal. These signals may destructively interfere with each other, even though each signal may separately be a good usable signal.

To further reduce the delay spread problem, some paging providers increase the number of base station transmitters in a paging coverage area and use down-tilt antennas to concentrate more of the transmitted power in the regions closer to the antenna. This effectively increases the relative strengths of signals received by a paging device from nearby base station transmitters compared to the relative strengths of signals received from more remote base station transmitters. However, this approach greatly increases the amount of infrastructure required to cover a region. Correspondingly, the equipment cost of the messaging paging system rises, as does the monthly fee paid by each subscriber.

Therefore, there exists a need in the art for an improved wireless communication system that minimizes the problems associated with the delay spread of simulcast signals. In particular, there is a need for an improved wireless communication system that minimizes delay spread problems without significantly increasing the equipment cost necessary to operate the system.

SUMMARY OF THE INVENTION

The limitations inherent in the prior art described above are overcome by a launch delay controller, for use in a wireless messaging system having a defined coverage area, for controlling the transmission of paging messages from a plurality of transmitters in the wireless messaging system. In one embodiment of the present invention, the launch delay controller comprises: 1) a memory capable of storing a) a delay spread associated with a selected point in the coverage area between a first signal transmitted by a first of the plurality of transmitters and a second signal transmitted by a second of the plurality of transmitters, and b) distances between the selected point and the first and second transmitters; and 2) a processor capable of determining from the delay spread and the distances an offset delay, wherein the offset delay is used by the first transmitter to delay a transmission of the first signal with respect to a transmission of the second signal, the delayed transmission of the first signal thereby reducing the delay spread.

In one embodiment of the present invention, the delay spread is measured at the selected point.

In another embodiment of the present invention, the delay spread is a theoretical predicted value associated with the selected point.

In still another embodiment of the present invention, the memory is capable of storing a plurality of delay spreads associated with a plurality of selected points in the coverage area, and a plurality of distances between each of the selected points and each of the plurality of transmitters.

In yet another embodiment of the present invention, the processor determines from the plurality of delay spreads and the plurality of distances a plurality of offset delays, wherein a first offset delay is used by the first transmitter to delay a transmission of the first signal with respect to a transmission of the second signal, and a second offset delay is used by the second transmitter to delay a transmission of the second signal with respect to a transmission of a third signal by a third of the plurality of transmitters, wherein the delayed transmissions of the first and second signals thereby reduces at least two of the delay spreads.

In a further embodiment of the present invention, the launch delay controller determines a plurality of offset delays operable to optimize a plurality of delay spreads throughout the coverage area.

In a still further embodiment of the present invention, the launch delay controller assigns a weighting factor to at least one of the selected points and uses the weighting factor to modify at least one of the offset delays such that a first delay spread is more greatly reduced than a second delay spread.

The foregoing SUMMARY OF THE INVENTION outlines, rather broadly, some advantageous features of various embodiments of the present invention so that those of ordinary skill in the art may better understand the DETAILED DESCRIPTION that follows. Additional features of the invention will be described hereafter that form the subject matter of the CLAIMS OF THE INVENTION. Those of ordinary skill in the art should appreciate that they can readily use the disclosed conception and specific embodiments as a basis for designing or modifying other structures for carrying out the same purposes of the present invention. Those of ordinary skill in the art should also realize that such equivalent constructions do not depart from the spirit and scope of the present invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, be a property of, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, wherein like numbers designate like objects and in which.

DETAILED DESCRIPTION

Figure 1:
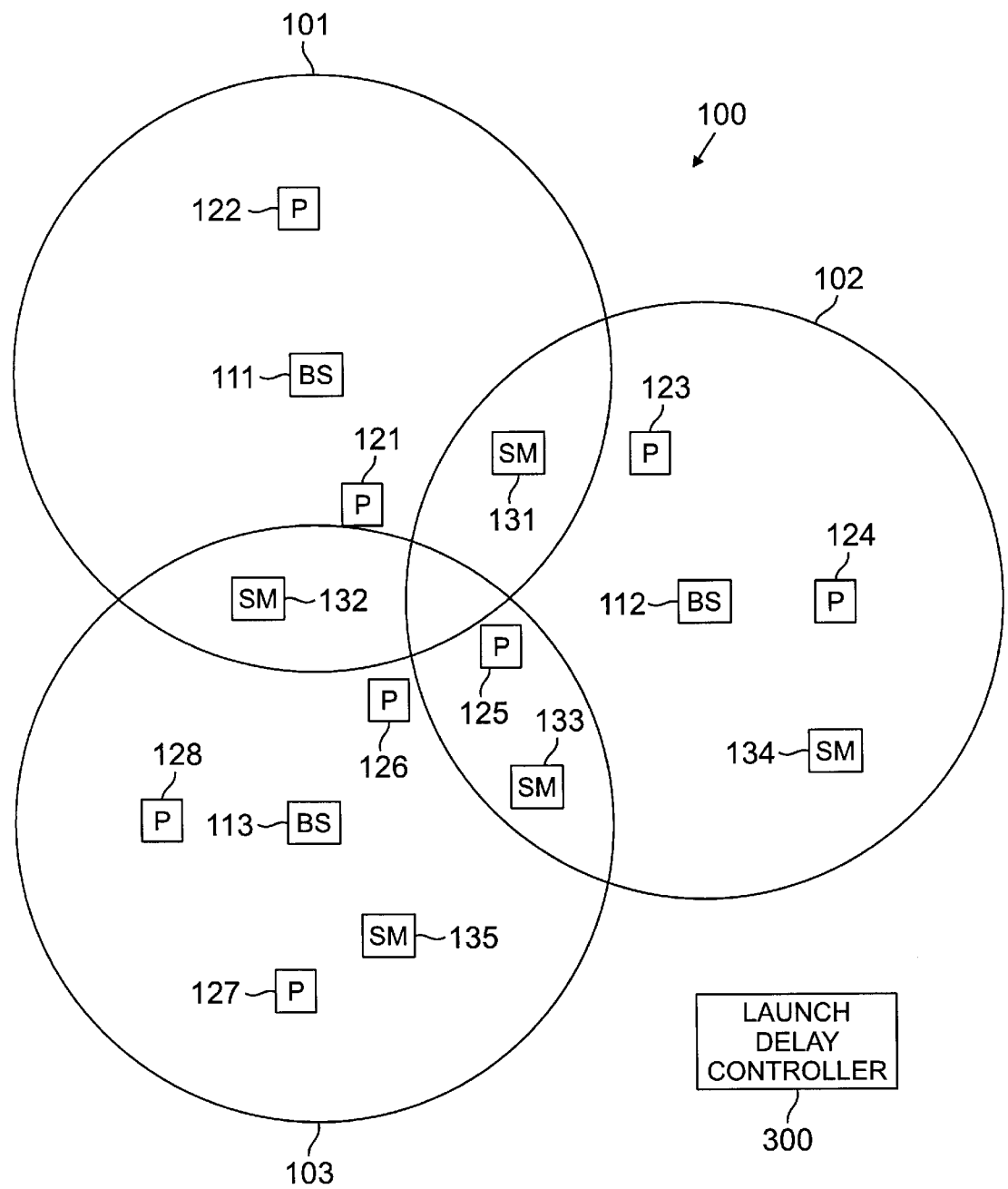
FIG. 1 illustrates a representative portion of a message paging network according to one embodiment of the present invention.

Turning initially to FIG. 1, illustrated is a representative portion of a message paging network (generally designated 100; hereafter, referred to as "messaging network 100") according to one embodiment of the present invention. Messaging network 100 may provide, for example, two-way voice and text messages to subscribers. Messaging network 100 is represented by three exemplary fixed land sites, called base stations, for communicating with a plurality of mobile communication units (e.g., message pagers, PCS devices, personal data assistant and other processing systems that include wireless communication functionality, etc.) within messaging network 100. Base stations 111, 112 and 113, each labeled "BS" in FIG. 1, have coverage areas 101, 102, and 103, respectively, that are determined by the power of the transmitters in base stations 111, 112, and 113. For the purposes of illustration and discussion, coverage areas 101, 102, and 103 are shown as circles. In real world environments, however, each of coverage areas 101, 102, and 103 may differ significantly from an idealized circular form.

Message network 100 also comprises a plurality of signal monitors 131–135. Signal monitors 131–135 will be discussed below in greater detail in connection with FIGS. 1–4.

For purposes of illustration, a plurality of message paging units, each labeled "P" in FIG. 1, are shown scattered throughout messaging network 100. Paging units 121 and 122 are located within coverage area 101 and may engage in two-way messaging with base station 111. Paging units 123 and 124 are located in coverage area 102 and may engage in two-way messaging with base station 112. Paging units 126, 127 and 128 are located in coverage area 103 and may engage in two-way messaging with base station 113. Paging unit 125 is in coverage areas 102 and 103 and may engage in two-way messaging with base stations 112 and 113.

In a narrowband messaging environment, such as FDMA, base stations 111, 112, and 113 transmit messages as RF signals in a forward-channel, such as from 939–940 MHz, for example. Base stations 111, 112, and 113 receive messages as RF signals in a reverse-channel at, for example, 901–902 MHz. Each base station is effectively a transceiver that contains an RF transmitter and an RF receiver for carrying out two-way communications. Each paging unit receives forward-channel messages directed to it at a selected frequency within the forward-channel. Each paging unit also transmits reverse-channel messages at a selected frequency within the reverse-channel.

Messaging network 100 may be, for example, a two-way wireless messaging system compatible with the MOTOROLA® ReFLEX™ transport protocol. The ReFLEX™ protocol may be used to send a numeric message, such as a conventional 10-digit telephone number, to a paging unit. The paging unit may then transmit in the reverse-channel an automatic acknowledgment message that does not require subscriber action. Alternatively, the ReFLEX™ protocol may be used in an enhanced paging mode to send a more complex alphanumeric message, such as an e-mail text message, to the paging unit. The pager may then transmit in the reverse-channel an automatic acknowledgment message that does not require subscriber action. Some time later, the subscriber may transmit a "canned" message stored in the paging unit, such as "Will Call You Later", or a unique message composed by the subscriber. Additionally, the paging unit may be enabled to transmit or receive voice messages of short duration recorded by the subscriber or a caller.

Base station 111 transmits data and voice messages to paging units in coverage area 101; base station 112 transmits data and voice messages to paging units in coverage area 102; and base station 113 transmits data and voice messages to paging units in coverage area 103. Base stations 111, 112, and 113 may be connected to one another and to a central control facility (not shown) by a wired backbone, such as a proprietary fiber-optic network. In alternate embodiments, base stations 111, 112, and 113 may be connected to one another and to a central control facility by a satellite communications link, such as through a very small aperture terminal ("VSAT").

Voice and text paging messages may be received into the central control facility from a variety of sources. Some messages may be received from the public telephone system in the form of simple call-back numbers entered by a caller on a DTMF keypad. Alphanumeric messages may be received by the central control facility from an Internet connection. Additionally, voice messages from callers may be received from the public telephone system and recorded for subsequent transmission to the subscriber.

For example, in one embodiment of the present invention, a paging message may be initiated when a caller dials a subscriber's phone number (including, if necessary, an area code). Using the subscriber's number, the local telephone company automatically connects the call to a long distance carrier. The long distance carrier then routes the call to a regional paging center. For example, all paging messages in a region containing Texas, Oklahoma and Louisiana may be routed by the local telephone company and then the long distance carrier to a regional paging center in Dallas, Tex.

From different regional paging centers nationwide, all paging messages may then be transferred by high-speed communication links to a national paging center in, for example, St. Louis. At the national paging center in St. Louis, all of the paging messages may then be transmitted by an up-link to a communications satellite. The satellite down-link then transmits all of the paging messages to receiver antennas on base stations around the country.

Each base station contains appropriate filtering circuitry in order to capture and transmit only those paging messages directed to a subscriber that is located in the local coverage area serviced by the base station. The paging messages may be filtered by frequency, time slot, or coding, or a combination thereof. For example, base stations in the New York City area capture and transmit only those paging messages directed to subscriber's located in the New York City area.

As described above in the BACKGROUND OF THE INVENTION, once the base stations receive a group (or queue) of paging messages, the base stations simultaneously broadcast (simulcast) the paging messages in order to minimize delay spread problems in area that are approximately midway between base station transmitters. The base stations may be synchronized by any one of a number of methods (some of which are described above) in order to create, as closely as possible, a simultaneous launch from the transmitters in the base stations.

It was also noted in the BACKGROUND OF THE INVENTION that synchronizing the launch of paging messages from the base station transmitters does not eliminate problems associated with delay spread. Delay spread caused by reflections and obstructions may still cause significant service quality problems in defined geographic regions. Prior art solutions to these problems have generally centered on costly infrastructure changes, such as introducing more base stations that broadcast at lower power.

The present invention introduces the novel concept of introducing one or more offset delays into the launch times of paging messages from one or more base station transmitters in a defined service area. By delaying the launch of a paging message from one base station, a delay spread problem that persisted in a previously synchronized paging system may be minimized or eliminated.

Consider, for example, a paging system transmitting at 3200 bits per second (bps). Each symbol has a duration of $\frac{1}{3200}$= 312.5 microseconds. A time delay of less than 25% of a symbol duration will generally yield an acceptable bit error rate (BER). Therefore, it is desirable to keep the delay spread in the coverage area below a theoretical threshold of about 78 microseconds. Practical experience, however, frequently shows that the BER may become unacceptably high much sooner than the theoretical threshold. As a practical matter it may be necessary to impose an actual maximum threshold delay spread below, for example, 50 microseconds.

If it is determined that, in a trouble spot between two base station transmitters, there is a measured delay spread exceeding 50 microseconds (as a result of physical obstructions, for example), the delay spread may be reduced and perhaps eliminated by introducing an offset delay at the base station transmitter whose signal reaches the trouble spot first. Delaying the launch of the earlier arriving signal causes the two signals to come back into alignment.

To facilitate the introduction of offset delays into the launch times of paging messages at the base stations, message network 100 also comprises a launch delay controller 300 and a plurality of signal monitors 131–135 that are used to measure different signal parameters in the service area covered by message network 100. Signal monitors 131–135 may measure, among other parameters, delay time, received signal strength (RSS), noise amplitude, frequency, and the like. These signal parameters are measured for each signal transmitted from each base station transmitter. Signal monitors 131–135 may be fixed sites that are remotely operated, or may be mobile devices operated by field engineers. Signal monitors 131–135 relay the measured parameters to launch delay controller 300 by any conventional means, including by land lines, by wireless transmission, or by downloading from a storage disk that has been physically transported from a signal monitor to launch delay controller 300.

It may be observed that introducing an offset delay into the launch time of paging messages at one base station transmitter may minimize a delay spread in one geographical region of the coverage area of messaging network 100, but may also worsen the delay spread problem in a different geographical region. In a preferred embodiment of the present invention, the launch delay controller 300 adjusts the offset delays in the base station transmitters to obtain an optimum level of service throughout the paging service coverage area of messaging network 100. The present invention does this by measuring signal parameters at defined points (or sites) in a "site evaluation grid" covering the entire service coverage area and using an optimization algorithm that provides an optimum solution for the coverage area.

In a preferred embodiment of the present invention, launch delay controller 300 assigns weights to different geographical regions in the site evaluation grid covering the paging service coverage area of messaging network 100. By weighting certain grid blocks, the delay spread in the weighted grid blocks may be more greatly reduced than in non-weighted grid blocks. In this manner, the present invention may be used to provide better coverage (i.e., less delay spread) in highly populated areas than in low population density areas.

In a preferred embodiment of the present invention, launch delay controller 300 may also use delay spread values that are determined by a software application tool that models the messaging network 100 and generates theoretical predicted delay spread values at selected sites in the coverage area of messaging network 100. This is particularly useful when the infrastructure of messaging network 100 is initially being designed and again later when the infrastructure is modified.

Figure 2:
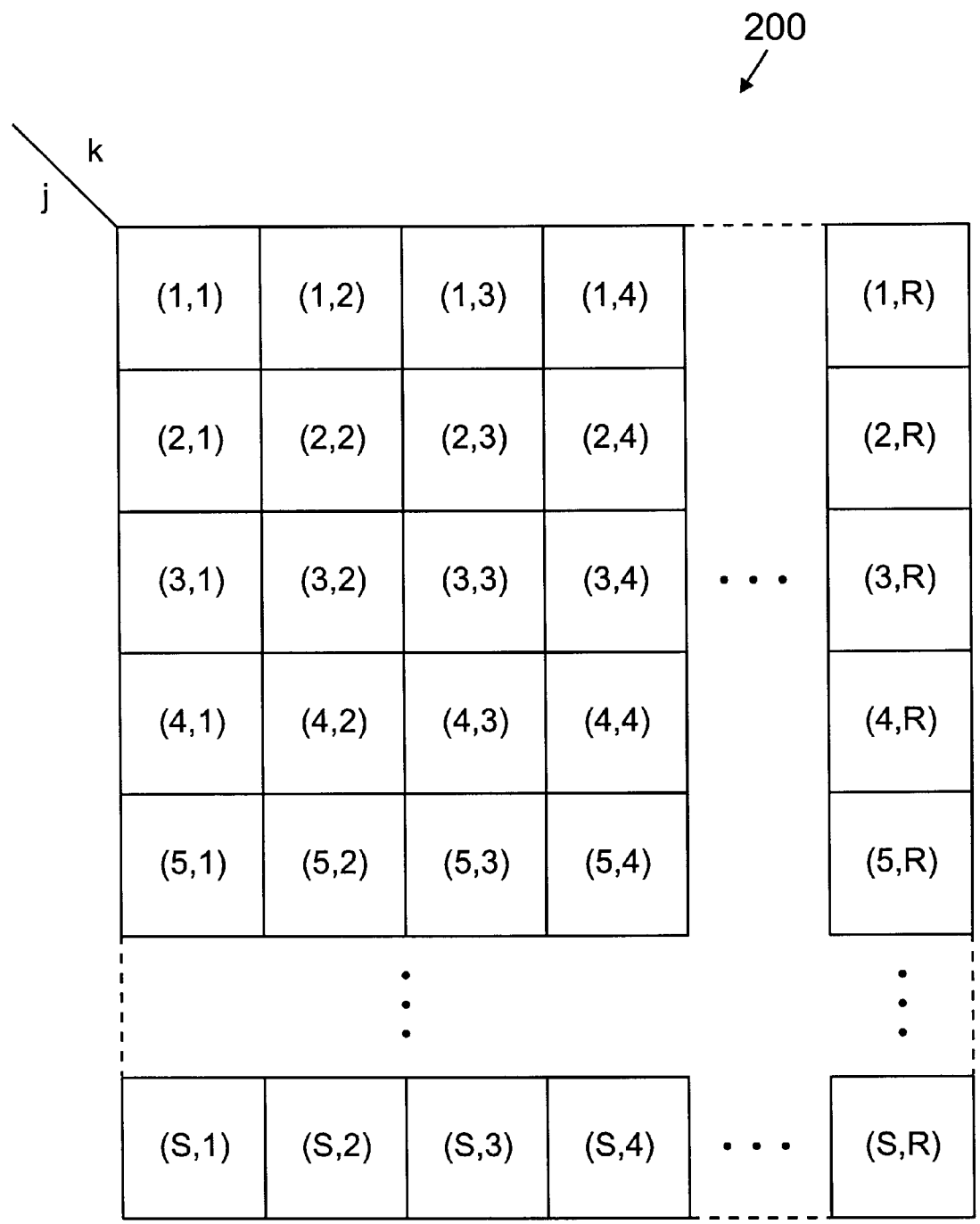
FIG. 2 illustrates an exemplary site evaluation grid 200 overlaid on the coverage area of the messaging network 100 in FIG. 1, according to one embodiment of the present invention.

FIG. 2 illustrates an exemplary site evaluation grid 200 overlaid on the coverage area of messaging network 100 in FIG. 1, according to one embodiment of the present invention. Site evaluation grid 200 comprises a matrix of S rows and R columns wherein each grid block in the grid 200 is identified by a (j,k) index, where j denotes row number and k denotes column number. Thus, the coverage region of messaging network 100 is divided into R×S grid blocks, wherein grid block size is determined by the number of rows and columns selected by the system engineers. Using a larger number of smaller grid blocks allows delay spread measurements to be recorded with a finer degree of resolution throughout the coverage area of messaging network 100.

The number of grid blocks in grid 200 is independent of the number of base stations in messaging network 100. For example, each base station may transmit across a region that is several miles in diameter. However, the grid blocks in grid 200 may be, for example, squares that are only ¼ mile (or ½ mile) on a side. It is recalled from FIG. 1, that base stations 111–113 are only a representative portion of messaging network 100. Thus, grid 200 may be overlaid across the geographical regions serviced by base stations 111–113, as well as the geographical regions covered by many other base stations that are not shown in FIG. 1.

Signal monitors 131–135 record measurements within the physical boundaries of each grid block in grid 200. Preferably, the signal parameters are measured at a grid point (j,k) located near the center of each grid block in grid 200. However, it is not absolutely essential that the grid point (j,k) at which measurements are taken be at the center of each grid block. In addition to measuring signal parameters at each grid point (j,k), the distance to each transmitter site in messaging network 100 is also determined with respect to each grid point (j,k). Messaging network 100 contains M transmitters, wherein each base transmitter site is designated as "transmitter site i". Thus, the distance is accurately determined from each grid point (j,k) to each transmitter site i.

The rectangular shapes of the site evaluation grid 200 and the grid blocks therein are chosen merely for the purposes of illustration. In a real world environment, the coverage area of messaging network 100 is not likely to be perfectly rectangular. As a practical matter, grid 200 may be overlaid on an amorphously-shaped coverage area of messaging network 100. Those grid blocks that fall outside the amorphously-shaped coverage area may simply be disregarded. Only the grid blocks and grid points (j,k) that fall within the amorphously-shaped coverage area of messaging network 100 are considered by the optimization algorithm in order to adjust the offset delays at each of the M transmitter sites in messaging network 100.

To facilitate the offset delay calculations, the present invention labels each of M transmitter sites with an index i with respect the area of interest. The optimization algorithm implemented by launch delay controller 300 uses the following notations and formulae:

1) $D_{ijk}$: "time-of-flight" (i.e., propagation delay) in seconds between grid point (j,k) and transmitter site i.
2) $O_i$: offset delay in seconds of launch time at transmitter site i with respect to some arbitrary time (e.g., the launch time of a synchronized system).
3) $W_{jk}$: weighting factor for grid point (j,k).
4) $P_{ijk}$: Normalized signal at grid point (j,k) from transmitter site i, where $$\sum_i P_{ijk} = 1.$$

The received signal strength indicator (RSSI) at each grid point (j,k) is divided by the summation of all RSSIs from all transmitter sites to grid point (j,k).

The total squared delay spread for the area is:

$$f = \sum_{j,k} \left\{ \sum_i P_{ijk}(D_{ijk} + O_i)^2 - \left[ \sum_i P_{ijk}(D_{ijk} + O_i) \right]^2 \right\} W_{jk} \quad \text{[Eqn. 1]}$$

Taking partial derivatives of "f" with respect to $O_i$, and setting it to zero, we find:

$$PD(i) + O(i) \times P(i) - P2D(i) - P2(i) = 0 \text{ where:} \quad \text{[Eqn. 2]}$$

$$PD(i) = \sum_{j,k} D_{ijk} \times P_{ijk} \times W_{jk}, \quad \text{[Eqn. 3]}$$

$$P(i) = \sum_{j,k} P_{ijk} \times W_{jk}, \quad \text{[Eqn. 4]}$$

$$P2D(i) = \sum_{j,k} W_{jk} \left[ P_{ijk} \sum_m P_{mjk} \times D_{mjk} \right] \text{ and} \quad \text{[Eqn. 5]}$$

$$P2(i) = \sum_m O_m \sum_{j,k} P_{ijk} \times P_{mjk} \times W_{jk} \quad \text{[Eqn. 6]}$$

The summation index "m" runs over all M transmitter sites.

The solutions to Equation 2, one for each transmitter site, are not unique, since offsetting all delays by a constant offset amount will not change the delay spreads. An extra constraint can be imposed upon Equation 2:

$$\sum_i O_i = 0. \quad \text{[Eqn. 7]}$$

Equations 2 and 7 are linear with respect to all $O_i$ and can be solved by an inversion of the coefficient matrix. The rationale behind the partial differentiation is that there is one global minimum which satisfies Equation 2. Since Equations 2 and 3 have one solution only, that solution is a global minimum for the system.

Figure 3:
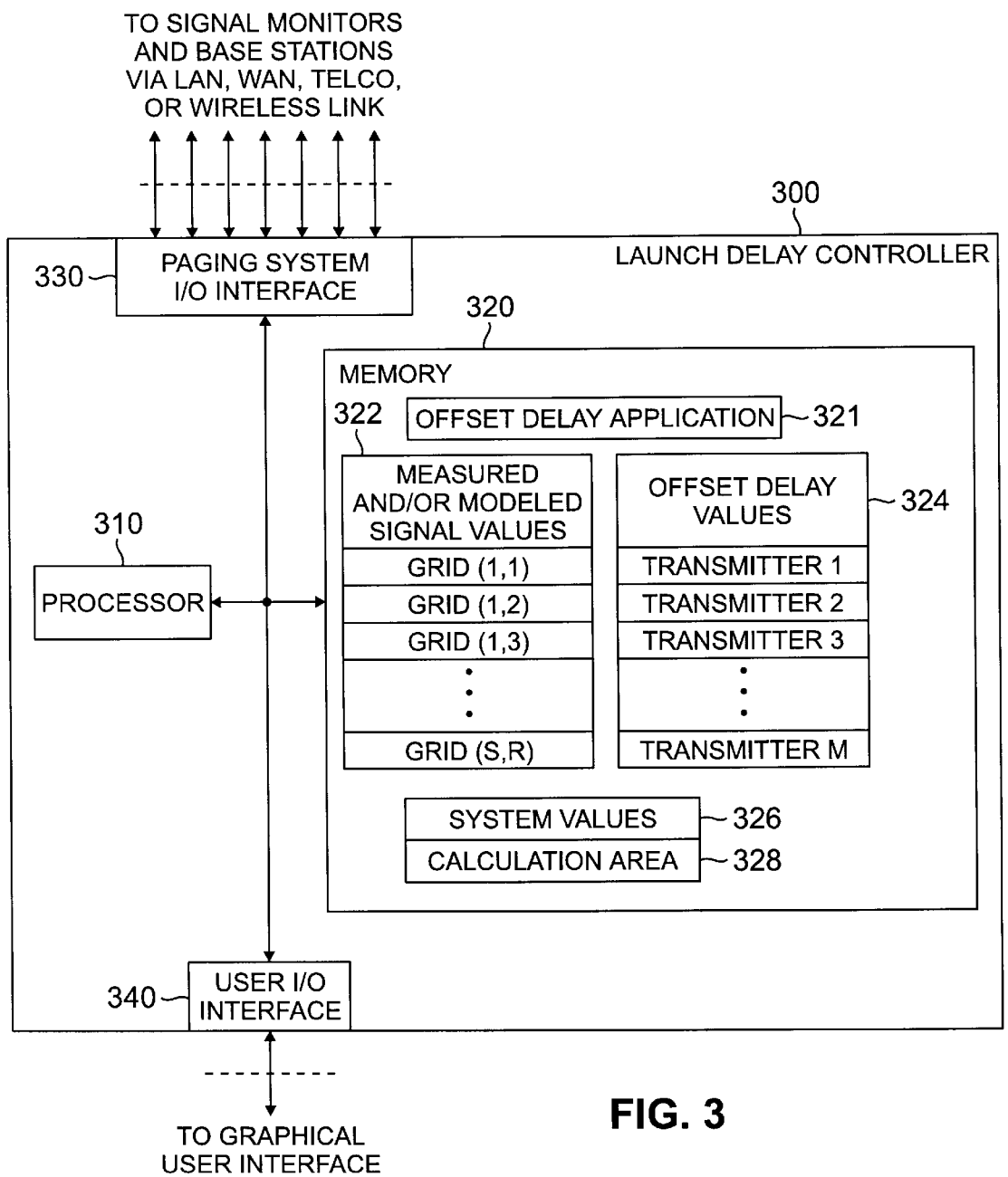
FIG. 3 illustrates an exemplary launch delay controller according to one embodiment of the present invention.

FIG. 3 illustrates an exemplary launch delay controller 300 according to one embodiment of the present invention. Launch delay controller 300 comprises a processor 310, a memory 320, a paging system I/O interface 330, and a user I/O interface 340. Launch delay controller 300 receives measured signal parameters from signal monitors 131–135 via paging system I/O interface 330. Launch delay controller 300 may be coupled to the signal monitors and to the base stations 111–113 via a local area network (LAN) connection, a wide area network (WAN) connection, a local telephone company (TELCO) connection, or by means of a wireless communication link, such as a bi-directional microwave link. Launch delay controller 300 also communicates with the base stations 111–113 via paging system I/O interface 330 in order to send offset delay values to the base station transmitters.

Processor 310 is responsible for executing the optimization algorithm in order to calculate the offset delays for the transmitter sites. The optimization algorithm resides in memory 320 as part of an Offset Application Program 321. Memory 320 also comprises a measured and/or modeled signal value table 322, which contains measured signal parameters from each grid point (j,k) in grid 200 and/or modeled signal parameters for each grid point. The modeled signal parameters are modeled by a software application tool that predicts these values based on transmitter locations, terrain features, natural and man-made obstacles, and the like. Memory 320 also comprises an offset delay value table 324, which contains the offset delays for each of the M transmitters in messaging network 100.

In order to perform the calculations described above in connection with the optimization algorithm, certain system values 326 are also stored in memory 320, such as the physical distances between each grid point (j,k) and each transmitter site i and the weighting factor, if any, for each grid block in grid 200. Preferably, the weighting factors are chosen in order to favor grid blocks having a high population density over grid blocks having a low population density. Memory 320 also comprises a calculation area 328 for storing intermediate values produced by the optimization algorithm equations described above.

In a preferred embodiment of the present invention, launch delay controller 300 also communicates with a graphical user interface, such as a desktop personal computer (PC) used by a system engineer in order to monitor the performance of messaging network 100 and to input data, such as system values or measured signal parameters, if necessary.

Figure 4:
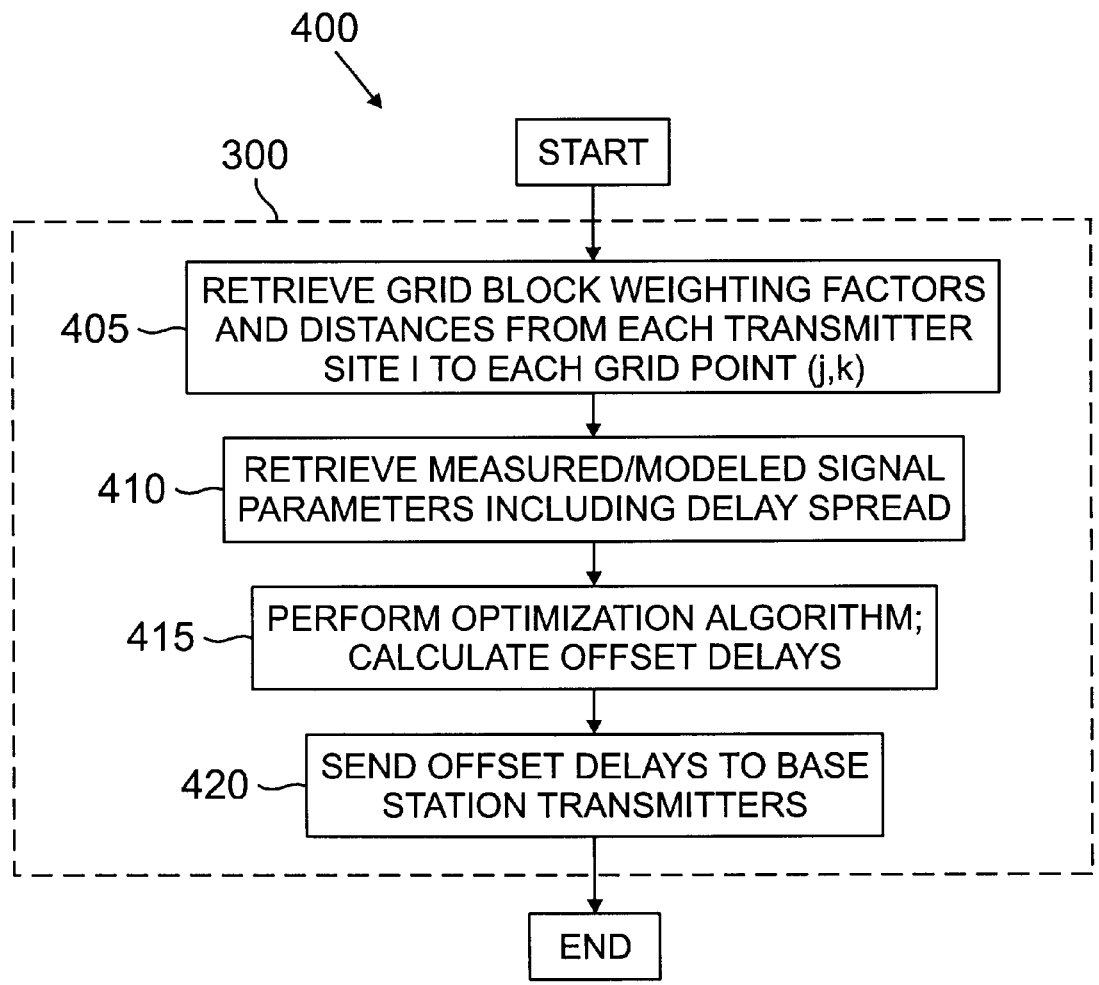
FIG. 4 is a flow diagram illustrating the operation of the exemplary launch delay controller according to one embodiment of the present invention.

FIG. 4 is a flow diagram 400 illustrating the operation of the exemplary launch delay controller 300 according to one embodiment of the present invention. Initially, launch delay controller 300 retrieves weighting factors, if any, for the grid blocks and the distance values separating each grid point (j,k) from each transmitting site i (process step 405). The distance and weighting factors may be retrieved via user I/O interface 340 in any conventional manner, including from a storage disk or by user entry.

Next, launch delay controller 300 retrieves the measured signal parameters recorded by the signal monitors at each of the grid points (j,k) via paging system interface 330 (process step 410). Optionally, the measured signal parameters may be stored on, for example, a magnetic storage disk and launch delay controller 300 may retrieve the signal parameters from the storage disk via user I/O interface 340. Next, processor 310 executes the optimization algorithm in order to calculate the offset delays (process step 415). The offset delays are then transferred to the base station transmitters via paging system I/O interface 330 (process step 420). Each base station transmitter delays launching its queue of paging messages past the synchronized simulcast launch time by a time period equal to the offset delay.

Although the principles of the present invention have been described in detail with reference to message paging system and infrastructure embodiments, those of ordinary skill in the art should understand that they can make various changes, substitutions and alterations herein without departing from the spirit and scope of the invention in its broadest form.

What is claimed is:

1. For use in a wireless messaging system capable of broadcasting over a selected coverage area, a launch delay controller for controlling a transmission of paging messages from a plurality of transmitters in said wireless messaging system, said launch delay controller comprising:
   a memory capable of storing 1) a delay spread associated with a selected point in said coverage area between a first signal transmitted by a first of said plurality of transmitters and a second signal transmitted by a second of said plurality of transmitters, and 2) distances between said selected point and said first and second transmitters;
   a processor capable of determining from said delay spread and said distances an offset delay, wherein said offset delay is used by said first transmitter to delay a transmission of said first signal with respect to a transmission of said second signal, said delayed transmission of said first signal thereby reducing said delay spread.

2. The launch delay controller as set forth in claim 1 wherein said delay spread is measured at said selected point.

3. The launch delay controller as set forth in claim 1 wherein said delay spread is a theoretical predicted value associated with said selected point.

4. The launch delay controller as set forth in claim 1 wherein said memory is capable of storing a plurality of delay spreads associated with a plurality of selected points in said coverage area, and a plurality of distances between each of said selected points and each of said plurality of transmitters.

5. The launch delay controller as set forth in claim 4 wherein said processor determines from said plurality of delay spreads and said plurality of distances a plurality of offset delays, wherein a first offset delay is used by said first transmitter to delay a transmission of said first signal with respect to a transmission of said second signal, and a second offset delay is used by said second transmitter to delay a transmission of said second signal with respect to a transmission of a third signal by a third of said plurality of transmitters, wherein said delayed transmissions of said first and second signals thereby reduce at least two of said delay spreads.

6. The launch delay controller as set forth in claim 5 wherein said launch delay controller determines a plurality of offset delays operable to optimize a plurality of delay spreads throughout said coverage area.

7. The launch delay controller as set forth in claim 5 wherein said launch delay controller assigns a weighting factor to at least one of said selected points and uses said weighting factor to modify at least one of said offset delays such that a first delay spread is more greatly reduced than a second delay spread.

8. A wireless messaging system capable of broadcasting over a selected coverage area comprising:

a plurality of transmitters capable of transmitting a plurality of paging message signals; and a launch delay controller for controlling the transmission of paging message signals from said plurality of transmitters, said launch delay controller comprising:

a memory capable of storing 1) a delay spread associated with a selected point in said coverage area between a first signal transmitted by a first of said plurality of transmitters and a second signal transmitted by a second of said plurality of transmitters, and 2) distances between said selected point and said first and second transmitters;

a processor capable of determining from said delay spread and said distances an offset delay, wherein said offset delay is used by said first transmitter to delay a transmission of said first signal with respect to a transmission of said second signal, said delayed transmission of said first signal thereby reducing said delay spread.

9. The wireless messaging system set forth in claim 8 wherein said delay spread is measured at said selected point.

10. The wireless messaging system set forth in claim 8 wherein said delay spread is a theoretical predicted value associated with said selected point.

11. The wireless messaging system set forth in claim 8 wherein said memory is capable of storing a plurality of delay spreads associated with a plurality of selected points in said coverage area, and a plurality of distances between each of said selected points and each of said plurality of transmitters.

12. The wireless messaging system set forth in claim 11 wherein said processor determines from said plurality of delay spreads and said plurality of distances a plurality of offset delays, wherein a first offset delay is used by said first transmitter to delay a transmission of said first signal with respect to a transmission of said second signal, and a second offset delay is used by said second transmitter to delay a transmission of said second signal with respect to a transmission of a third signal by a third of said plurality of transmitters, wherein said delayed transmissions of said first and second signals thereby reduces at least two of said delay spreads.

13. The wireless messaging system set forth in claim 12 wherein said launch delay controller determines a plurality of offset delays operable to optimize a plurality of delay spreads throughout said coverage area.

14. The wireless messaging system set forth in claim 12 wherein said launch delay controller assigns a weighting factor to at least one of said selected points and uses said weighting factor to modify at least one of said offset delays such that a first delay spread is more greatly reduced than a second delay spread.

15. For use in a wireless messaging system capable of broadcasting over a selected coverage area, a method for controlling a transmission of paging messages from a plurality of transmitters in the wireless messaging system, the method comprising the steps of:

determining a delay spread associated with a selected point in the coverage area between a first signal transmitted by a first of the plurality of transmitters and a second signal transmitted by a second of the plurality of transmitters;

determining distances between the selected point and the first and second transmitters; and determining from the delay spread and the distances an offset delay, wherein the offset delay is used by the first transmitter to delay a transmission of the first signal with respect to a transmission of the second signal, the delayed transmission of the first signal thereby reducing the delay spread.

16. The method as set forth in claim 15 wherein the delay spread is measured at the selected point.

17. The method as set forth in claim 15 wherein the delay spread is a theoretical predicted value associated with the selected point.

18. The method as set forth in claim 15 including the further steps of determining a plurality of delay spreads associated with a plurality of selected points in the coverage area, and determining a plurality of distances between each of the selected points and each of the plurality of transmitters.

19. The method as set forth in claim 18 including the further steps of determining from the plurality of delay spreads and the plurality of distances a plurality of offset delays, wherein a first offset delay is used by the first transmitter to delay a transmission of the first signal with respect to a transmission of the second signal, and a second offset delay is used by the second transmitter to delay a transmission of the second signal with respect to a transmission of a third signal by a third of the plurality of transmitters, wherein the delayed transmissions of the first and second signals thereby reduce at least two of the delay spreads.

20. The method set forth in claim 19 including the further steps of determining a weighting factor of at least one of the selected points and using the weighting factor to modify at least one of said offset delays such that a first delay spread is more greatly reduced than a second delay spread.

\* \* \* \* \*

UNITED STATES PATENT AND TRADEMARK OFFICE
CERTIFICATE OF CORRECTION

PATENT NO : 6,097,930
DATED : August 1, 2000
INVENTOR(S): Selwyn E. Hill and Chi-Ming Chang It is certified that error appears in the above-identified patent and that said Letters Patent are hereby corrected as shown below:

Column 1, line 20, "send" should be -- sent --.

Column 6, line 26, "subscriber's" should be -- subscribers --.

Column 6, line 31, "area" should be -- areas --.

Column 8, line 49, after "respect" insert -- to --.

Signed and Sealed this

Twenty-second Day of May, 2001

Attest:

NICHOLAS P. GODICI

Attesting Officer

Acting Director of the United States Patent and Trademark Office